(12) United States Patent
Benkreira et al.

(10) Patent No.: US 12,136,335 B2
(45) Date of Patent: *Nov. 5, 2024

(54) SYSTEMS AND METHODS FOR USING HAPTIC VIBRATION FOR INTER DEVICE COMMUNICATION

(71) Applicant: Capital One Services, LLC, McLean, VA (US)

(72) Inventors: Abdelkader Benkreira, Washington, DC (US); Joshua Edwards, Philadelphia, PA (US); Michael Mossoba, Great Falls, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/187,643

(22) Filed: Mar. 21, 2023

(65) Prior Publication Data
US 2023/0222883 A1 Jul. 13, 2023

Related U.S. Application Data

(63) Continuation of application No. 16/895,945, filed on Jun. 8, 2020, now Pat. No. 11,636,741, which is a
(Continued)

(51) Int. Cl.
*G08B 6/00* (2006.01)
*G06F 21/32* (2013.01)
(Continued)

(52) U.S. Cl.
CPC .............. *G08B 6/00* (2013.01); *G06F 21/32* (2013.01); *G06F 21/34* (2013.01); *G06F 21/40* (2013.01); *G06F 21/44* (2013.01)

(58) Field of Classification Search
CPC . G08B 6/00; G06F 21/32; G06F 21/34; G06F 21/40; G06F 21/44
See application file for complete search history.

(56) References Cited

U.S. PATENT DOCUMENTS 6,317,834 B1 * 11/2001 Gennaro .................. G07C 9/37
713/182
7,965,276 B1 * 6/2011 Martin ..................... G06F 3/016
345/184
(Continued)

OTHER PUBLICATIONS

Examination Report issued from the Canadian Intellectual Property Office (CIPO) in corresponding Canadian Patent Application No. 3,058,823 on Jan. 17, 2024 (7 pages).

*Primary Examiner* — Aravind K Moorthy
(74) *Attorney, Agent, or Firm* — Foley & Lardner LLP

(57) ABSTRACT

The present disclosure relates to systems and methods for using haptic vibration for inter-device communication. In one implementation, a system for inter-device communication using haptic vibration may include at least one force gauge configured to measure displacements caused by an external device in contact with the at least one force gauge; at least one memory storing instructions; and at least one processor configured to execute the instructions to: receive an identifier associated with a user; retrieve a pattern associated with the received identifier; receive, from the at least one force gauge, one or more measurements over a period of time; assess a degree of difference between the received one or more measurements and the retrieved pattern; and, when the degree of difference is below a threshold, authenticate the user.

20 Claims, 7 Drawing Sheets

Related U.S. Application Data continuation of application No. 16/237,598, filed on Dec. 31, 2018, now Pat. No. 10,679,473, which is a continuation of application No. 16/162,593, filed on Oct. 17, 2018, now Pat. No. 10,332,367.

(51) Int. Cl.
*G06F 21/34* (2013.01)
*G06F 21/40* (2013.01)
*G06F 21/44* (2013.01)

(56) References Cited

U.S. PATENT DOCUMENTS

| | | | |
|---|---|---|---|
| 8,015,118 B1* | 9/2011 | Robinson | H04L 63/0861 705/76 |
| 8,136,154 B2* | 3/2012 | Phoha | G06F 18/295 726/19 |
| 9,177,452 B1* | 11/2015 | Mosterman | G08B 6/00 |
| 9,306,962 B1* | 4/2016 | Pinto | H04L 63/1416 |
| 9,426,139 B1* | 8/2016 | McClintock | G06F 21/40 |
| 9,465,368 B1 | 10/2016 | Mitter et al. | |
| 9,706,406 B1* | 7/2017 | Adams | G06F 21/32 |
| 9,717,001 B2* | 7/2017 | Toyota | H04W 12/069 |
| 10,044,695 B1* | 8/2018 | Cahill | G06F 21/44 |
| 10,123,297 B1* | 11/2018 | Harney | G01S 5/02525 |
| 10,289,819 B2* | 5/2019 | Stavrou | G06F 21/316 |
| 10,332,367 B1* | 6/2019 | Benkreira | G06F 21/44 |
| 10,371,564 B2* | 8/2019 | Perez Jacome | G01G 19/415 |
| 10,547,610 B1* | 1/2020 | Faibish | H04L 9/3231 |
| 10,679,473 B2* | 6/2020 | Benkreira | G08B 6/00 |
| 10,733,986 B2* | 8/2020 | Hayakawa | G10L 15/30 |
| 10,824,703 B1* | 11/2020 | Desai | G06V 40/70 |
| 11,100,764 B1* | 8/2021 | Dant | G07F 19/207 |
| 11,636,741 B2* | 4/2023 | Benkreira | G06F 21/34 726/17 |
| 2005/0022034 A1* | 1/2005 | Chaudhari | G06F 21/32 726/19 |
| 2007/0067824 A1* | 3/2007 | Silverbrook | H04L 9/3234 726/2 |
| 2008/0169932 A1* | 7/2008 | Desrosiers | H04M 11/04 340/500 |
| 2009/0051667 A1* | 2/2009 | Park | G06F 3/04886 345/173 |
| 2009/0175509 A1* | 7/2009 | Gonion | G06F 1/3231 382/118 |
| 2009/0313693 A1* | 12/2009 | Rogers | H04W 12/06 345/173 |
| 2010/0210971 A1* | 8/2010 | Shabram | G01N 3/08 600/587 |
| 2011/0050394 A1* | 3/2011 | Zhang | G06F 21/32 340/5.82 |
| 2011/0224509 A1* | 9/2011 | Fish | G06F 21/6245 600/301 |
| 2012/0246737 A1* | 9/2012 | Paxton | G06F 16/24578 726/27 |
| 2013/0229078 A1* | 9/2013 | Garber | H02K 7/025 310/90.5 |
| 2014/0016854 A1* | 1/2014 | Nagatomo | G06T 7/001 382/149 |
| 2014/0059674 A1* | 2/2014 | Sun | G06F 21/44 726/19 |
| 2014/0076644 A1* | 3/2014 | Derenne | A61B 7/012 180/19.2 |
| 2014/0101740 A1* | 4/2014 | Li | G06F 21/32 726/7 |
| 2014/0300554 A1* | 10/2014 | Samuel | H04W 12/068 345/173 |
| 2015/0097657 A1* | 4/2015 | Gandhi | G06F 3/016 340/407.1 |
| 2015/0161386 A1* | 6/2015 | Gupta | G06N 5/04 726/22 |
| 2015/0294097 A1* | 10/2015 | Ramachandran | G06F 3/04883 726/28 |
| 2016/0006730 A1* | 1/2016 | Chari | G06F 21/32 726/7 |
| 2016/0025615 A1* | 1/2016 | Fishel | G01N 19/00 702/33 |
| 2016/0080897 A1* | 3/2016 | Moore | G06V 20/10 340/539.13 |
| 2016/0132669 A1* | 5/2016 | Pathangay | G06F 21/32 726/19 |
| 2016/0162673 A1* | 6/2016 | Kutliroff | G06F 18/28 382/115 |
| 2016/0182503 A1* | 6/2016 | Cheng | H04W 12/082 726/7 |
| 2016/0187987 A1* | 6/2016 | Ullrich | G08B 6/00 345/156 |
| 2016/0189493 A1* | 6/2016 | Rihn | G06T 15/00 340/407.1 |
| 2016/0209925 A1* | 7/2016 | Saboune | G08B 6/00 |
| 2016/0250486 A1* | 9/2016 | Yoder | G16Z 99/00 340/870.07 |
| 2016/0300050 A1* | 10/2016 | Hecht | H04W 12/06 |
| 2016/0371691 A1* | 12/2016 | Kang | G06F 3/0484 |
| 2017/0052148 A1* | 2/2017 | Estevez | G01N 29/075 |
| 2017/0091595 A1* | 3/2017 | Wang | G06F 21/32 |
| 2017/0161485 A1* | 6/2017 | Aguayo Gonzalez | G06F 21/44 |
| 2017/0192533 A1* | 7/2017 | Hargreaves | G06F 3/0383 |
| 2017/0200014 A1* | 7/2017 | Jing | G06F 21/60 |
| 2017/0228512 A1* | 8/2017 | Driscoll | G16H 40/63 |
| 2017/0365139 A1* | 12/2017 | Levesque | G06F 3/016 |
| 2017/0365234 A1* | 12/2017 | Yamazaki | G09G 3/34 |
| 2018/0007553 A1* | 1/2018 | Dutt | H04W 12/06 |
| 2018/0008204 A1* | 1/2018 | An | A61B 5/0205 |
| 2018/0012003 A1* | 1/2018 | Asulin | G06F 21/36 |
| 2018/0012228 A1* | 1/2018 | Milevski | G06Q 20/40145 |
| 2018/0014113 A1* | 1/2018 | Boesen | A61B 5/4866 |
| 2018/0024648 A1* | 1/2018 | Watanabe | G06F 3/0354 345/174 |
| 2018/0033262 A1* | 2/2018 | Shah | G06F 3/016 |
| 2018/0034850 A1* | 2/2018 | Turgeman | G06Q 30/0275 |
| 2018/0053105 A1* | 2/2018 | Paul | G06F 21/32 |
| 2018/0067558 A1* | 3/2018 | Eagleman | G09B 21/04 |
| 2018/0071915 A1* | 3/2018 | Khatib | B25J 9/1656 |
| 2018/0082502 A1* | 3/2018 | Browning | G07C 9/00309 |
| 2018/0107174 A1* | 4/2018 | Takahashi | G05B 9/02 |
| 2018/0130434 A1* | 5/2018 | Okamoto | G09G 3/3648 |
| 2018/0232511 A1* | 8/2018 | Bakish | G06F 21/32 |
| 2018/0299996 A1* | 10/2018 | Kugler | G06F 3/017 |
| 2018/0300465 A1* | 10/2018 | Esman | G06N 3/082 |
| 2018/0301140 A1* | 10/2018 | Turcott | G06N 3/044 |
| 2018/0314816 A1* | 11/2018 | Turgeman | G06F 21/40 |
| 2018/0341760 A1* | 11/2018 | Frempong | H04W 12/63 |
| 2018/0349583 A1* | 12/2018 | Turgeman | H04L 63/0861 |
| 2019/0050564 A1* | 2/2019 | Pogorelik | G06N 20/00 |
| 2019/0346545 A1* | 11/2019 | Sleasman | G01S 7/03 |
| 2019/0347463 A1* | 11/2019 | Lee | G06V 40/1318 |
| 2020/0033944 A1* | 1/2020 | Kiemele | G06F 3/0346 |
| 2020/0042095 A1* | 2/2020 | Ang | G06F 3/017 |
| 2020/0076866 A1* | 3/2020 | Wu | H04L 65/70 |
| 2020/0142773 A1* | 5/2020 | Yoneda | G11C 11/401 |
| 2020/0232121 A1* | 7/2020 | Finnegan | D01D 5/084 |
| 2020/0356235 A1* | 11/2020 | Arimatsu | G06F 3/01 |

* cited by examiner

SYSTEMS AND METHODS FOR USING HAPTIC VIBRATION FOR INTER DEVICE COMMUNICATION

CROSS-REFERENCE TO RELATED APPLICATIONS

This application is a continuation of U.S. patent application Ser. No. 16/895,945, filed Jun. 8, 2020, which is a continuation of U.S. patent application Ser. No. 16/237,598, filed Dec. 31, 2018, which is a continuation of U.S. patent application Ser. No. 16/162,593, filed Oct. 17, 2018. The content of each of the forgoing applications is incorporated herein in its entirety by reference.

TECHNICAL FIELD

This disclosure relates generally to the field of haptic communication. More specifically, and without limitation, this disclosure relates to systems and methods for using haptic vibration for inter-device communication.

BACKGROUND INFORMATION

Many devices authenticate themselves to other devices in order to perform particular functions. For example, a card associated with a customer communicates with an automated teller machine (ATM) before functions like withdrawals or deposits may be performed. In another example, a mobile phone associated with a customer communicates with a point-of-service (POS) machine to finalize a transaction with the POS machine.

However, traditional wireless communication suffers from security vulnerabilities, such as interception. Moreover, traditional physical communication such as magnetic strips, manual entry of a personal identification number (PIN), or other physical communications, may be intercepted using card skimmers, video cameras, or other devices used to capture the physically communicated information.

SUMMARY

Disclosed systems and methods for using haptic vibration for inter-device communication solve the problems associated with traditional wireless communication and physical communication systems. For example, the disclosed systems and methods may permit for easier authentication from a user perspective (e.g., because a user may use their existing smartphone rather than additional hardware such as a card and/or may not need to remember a PIN, password, or the like) simultaneously maintaining a high level of security. For example, two-factor authorization using haptic vibration as described herein may be more secure than conventional two-factor authorization techniques because it may be difficult for wireless communicators, card skimmers, or the like to intercept such vibrations. Moreover, the disclosed systems and methods for two-factor authorization using haptic vibration as described herein may improve experiences of users because users may use their existing smartphones, tablets, or other devices, rather than carry extra contactless cards and/or may not have to remember additional identifiers such as PINs.

There are many possible applications for such capabilities. Examples of applications include authentication of users at an ATM or other kiosks. Additional examples of application may include authentication of users to authorize transactions at a retailer, authentication of users at a turnstyle or other physical barrier to allow access to a building and/or a room, or the like.

Certain embodiments of the present disclosure include or use one or more external devices. As used herein, "external device" may refer to any device capable of performing haptic vibrations. For example, an external device may comprise a smartphone, a tablet, a keychain having a haptic motor, or the like.

Certain embodiments of the present disclosure include or use one or more force gauges. As used herein, "force gauge" may refer to a device or devices capable of converting deformation of one part of the gauge into an electrical signal representative of the deformation, e.g., an analog signal or a digital signal. For example, a force gauge may comprise a spring scale, a strain gauge, or the like.

Certain embodiments of the present disclosure include or use one or more accelerometers. As used herein, "accelerometer" may refer to a device or devices capable of converting mechanical motion of one part of the gauge into an electrical signal representative of the motion, e.g., an analog signal or a digital signal. For example, an accelerometer may comprise a micro electro-mechanical systems (MEMS) accelerometer, a piezoelectric accelerometer, a piezoresistive accelerometer, a capacitive accelerometer, or the like.

Certain embodiments of the present disclosure include or use one or more scales. As used herein, "scale" may refer to a device or devices capable of converting displacement of one part of the gauge into an electrical signal representative of a mass of an object causing the displacement, e.g., an analog signal or a digital signal. For example, a scale may comprise a spring scale, a hydraulic scale, a pneumatic scale, a string gauge scale, or the like.

Certain embodiments of the present disclosure include or use one or more cards associated with a user. As used herein, "card" may refer to any physical card including an identifier of the user. For example, a card may comprise an identification card (e.g., a state-issued identification card, an institution-issued identification card, such as a university-issued card, or the like), a transaction card (e.g., a credit card, a debit card, or the like), a smart card, or the like. The card may include a human-readable identifier or a computer-readable identifier (e.g., a bar code, whether one-dimensional or matrixed, a magnetic strip, a contactless chip, or the like), or a combination thereof.

According to an exemplary embodiment of the present disclosure, a system for inter-device communication using haptic vibration may comprise at least one force gauge configured to measure displacements caused by an external device in contact with the at least one force gauge; at least one memory storing instructions; and at least one processor configured to execute the instructions to perform operations. The operations may comprise receiving an identifier associated with a user; retrieving a pattern associated with the received identifier; receiving, from the at least one force gauge, one or more measurements over a period of time; assessing a degree of difference between the received one or more measurements and the retrieved pattern; and when the degree of difference is below a threshold, authenticating the user.

According to an exemplary embodiment of the present disclosure, a system for inter-device communication using haptic vibration may comprise at least one accelerometer configured to measure strength and timing of vibrations from an external device; at least one memory storing instructions; and at least one processor configured to execute the instructions to perform operations. The operations may comprise receiving an identifier associated with a user; retrieving a pattern comprising one or more strengths with respect to time associated with the received identifier; receiving, from the at least one accelerometer, one or more measurements of strengths over a period of time; assessing a degree of difference between the received one or more measurements of strengths and the one or more strengths of the retrieved pattern; and based on the degree of difference, determining whether to authenticate the user.

According to an exemplary embodiment of the present disclosure, a system for inter-device communication using haptic vibration may comprise at least one scale configured to measure weight of an external device; at least one of a force gauge or an accelerometer configured to measure vibrations from the external device; at least one memory storing instructions; and at least one processor configured to execute the instructions to perform operations. The operations may comprise receiving, from the at least one scale, a measured weight; determining, based on the measured weight, one or more expected models of the external device; receiving an identifier associated with a user; and retrieving an expected model associated with the received identifier. When the expected model comprises one of the one or more expected models, the operations may further comprise retrieving a pattern of vibrations associated with the received identifier; receiving, from the at least one of a force gauge or an accelerometer, one or more measurements of vibrations; assessing a degree of difference between the received one or more measurements and the retrieved pattern; and when the degree of difference is below a threshold, authenticating the user.

According to an exemplary embodiment of the present disclosure, a system for calibration of inter-device communication using haptic vibration may comprise at least one scale configured to measure weight of an external device; at least one of a force gauge or an accelerometer configured to measure vibrations from the external device; at least one memory storing a table mapping models of external devices to weights and to one or more transformations and storing instructions; and at least one processor configured to execute the instructions to perform operations. The operations may comprise receiving, from a user, an identifier of the user; receiving, from the at least one scale, a measured weight of the external device; determining, using the stored table, one or more likely models for the external device; transmitting a command to the external device configured to cause the external device to vibrate according to one or more patterns; receiving, from the at least one of a force gauge or an accelerometer, one or more measurements corresponding to the one or more patterns; selecting a correct model from the one or more likely models by verifying that the mapped one or more transformations transform the one or more measurements into the one or more patterns, within a margin of error; and associating the received identifier with the selected correct model.

According to an exemplary embodiment of the present disclosure, a system for calibration of inter-device communication using haptic vibration may comprise at least one of a force gauge or an accelerometer configured to measure vibrations from the external device; at least one memory storing instructions; and at least one processor configured to execute the instructions to perform operations. The operations may comprise receiving, from a user, an identifier of the user; transmitting a command to the external device configured to cause the external device to vibrate according to one or more patterns; receiving, from the at least one of a force gauge or an accelerometer, one or more measurements corresponding to the one or more patterns; generating a data structure mapping the one or more measurements to the one or more patterns; and indexing the data structure by the received identifier.

According to an exemplary embodiment of the present disclosure, a system for calibration of inter-device communication using haptic vibration may comprise at least one scale configured to measure weight of an external device; at least one of a force gauge or an accelerometer configured to measure vibrations from the external device; at least one memory storing instructions; and at least one processor configured to execute the instructions to perform operations. The operations may comprise receiving, from a user, an identifier of the user; receiving, from the user, an indication of a model of the external device; receiving, from the at least one scale, a measured weight of the external device; transmitting a command to the external device configured to cause the external device to vibrate according to one or more patterns; receiving, from the at least one of a force gauge or an accelerometer, one or more measurements corresponding to the one or more patterns; generating a data structure mapping the one or more measurements to the one or more patterns; indexing the data structure by the received model indication; and associating the received identifier with the received model indication and the measured weight.

Additional embodiments of the present disclosure include non-transitory computer-readable media storing instructions that cause one or more processors to execute any of the methods disclosed herein.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the disclosed principles. In the drawings.

DESCRIPTION OF THE EMBODIMENTS

The disclosed embodiments relate to systems and methods for using haptic vibration for inter-device communication. Embodiments of the present disclosure may be implemented using one or more general purpose computers in combination with at least one haptic motor and at least one sensor (e.g., an accelerometer, a force gauge, or the like). Alternatively or concurrently, one or more special purpose computer may be built according to embodiments of the present disclosure using suitable circuit elements, e.g., one or more application-specific integrated circuits or the like, in combination with at least one haptic motor and at least one sensor (e.g., an accelerometer, a force gauge, or the like).

Figure 1:
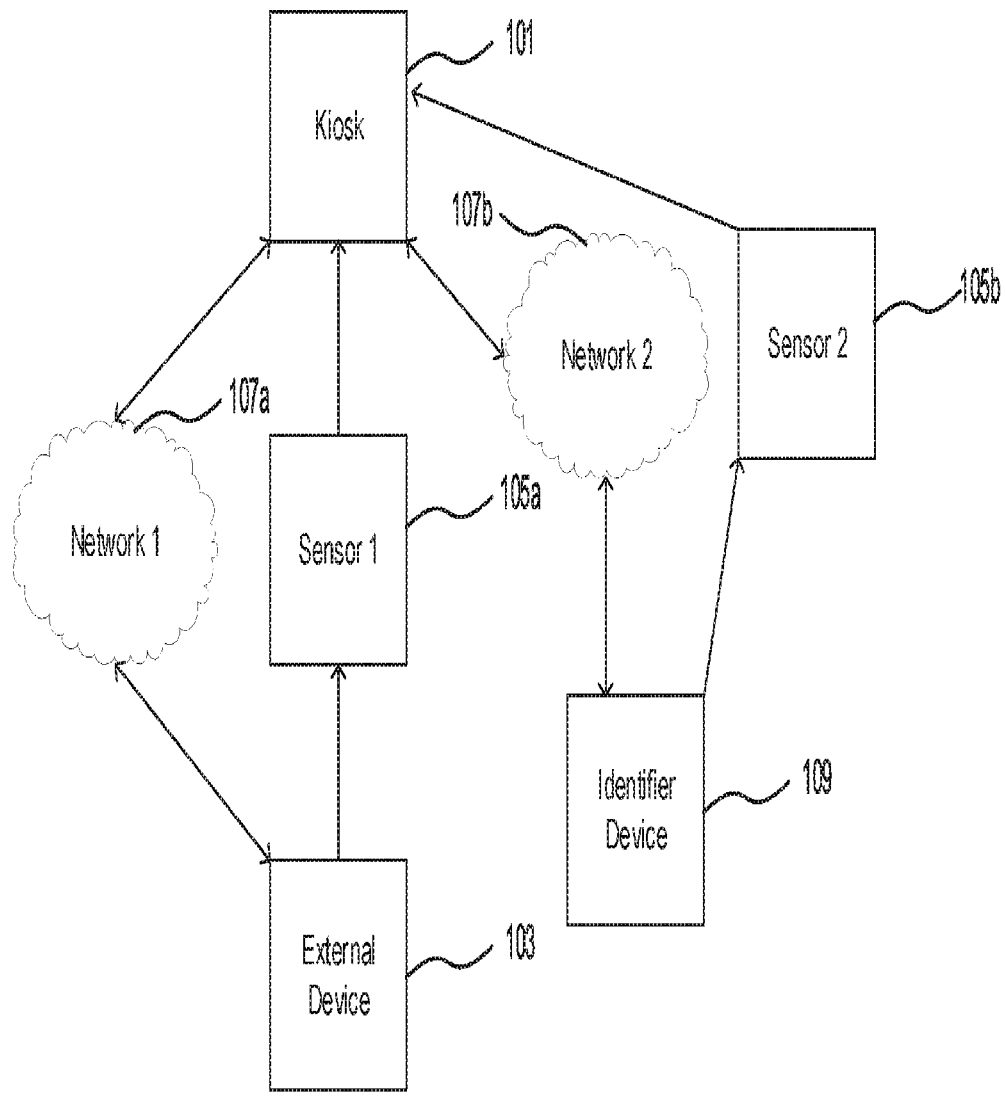
FIG. 1 is a schematic representation of an example system for using haptic vibration for inter-device communication, consistent with embodiments of the present disclosure.

FIG. 1 is a schematic representation of example system 100 for implementing inter-device communication using haptic vibration. System 100 may include a kiosk 101. For example, kiosk 101 may comprise an automated teller machine (ATM), an entry gate for a building or room, or the like. In some embodiments, kiosk 101 may comprise server 800 of FIG. 8 or communicate with server 800 of FIG. 8. For example, kiosk 101 may contact server 800 in order to authenticate users attempting to access kiosk 101 (e.g., if kiosk 101 is an ATM, access may comprise a withdrawal or a deposit) or to access an area protected by kiosk 101 (e.g., if kiosk 101 is an entry gate or a security system, access may comprise physical access to an area, such as a room or building, gated off by or armed by kiosk 101).

Kiosk 101 may include or communicate with at least two sensors, e.g., sensor 105a and sensor 105b. Sensor 105a may be configured to communicate with an external device 103 while sensor 105b may be configured to communicate with an identifier device 109 providing an identifier. In some embodiments, external device 103 may comprise keychain 600 of FIG. 6, smartphone 700 of FIGS. 7A and 7B, a tablet, or any other device having a haptic motor and configured to vibrate using the haptic motor. Accordingly, sensor 105a may comprise a force gauge, an accelerometer, or any other sensor configured to detect the vibrations of external device 103.

In some embodiments, identifier device 109 may comprise a card, another keychain, another smartphone, another tablet, or any other device capable of communicating an identifier to kiosk 101. Accordingly, sensor 105b may comprise a magnetic strip reader, a contactless reader, a barcode scanner, or any other sensor configured to extract an identifier from identifier device 109.

In some embodiments, as an alternative to external device 103 and identifier device 109, system 100 may include a single device that is configured to communicate vibrations to sensor 105a as well as to communicate an identifier to sensor 105b. For example, the single device may comprise a smartphone (e.g., smartphone 700 of FIGS. 7A and 7B) or a tablet having a haptic motor as well as contactless communication capabilities, a keychain (e.g., keychain 600 of FIG. 6) having a haptic motor as well as contactless communication capabilities, or the like.

External device 103 may further be configured to communicate with kiosk 101 using a computer network, e.g., network 107a. Network 107a may comprise the Internet, a local area network (LAN), or the like, and may use one or more wireless standards, such as Wi-Fi, 4G, long-term evolution (LTE), or the like, and/or one or more wired standards, such as Ethernet, token ring, or the like. Alternatively, network 107a may comprise a short-range communication link established using one or more standards, such as near-field communication (NFC), Bluetooth®, or the like. Accordingly, external device 103 may receive commands from kiosk 101, e.g., including commands to vibrate according to a pattern from kiosk 101 and/or a pattern stored on external device 103. In some embodiments, the pattern may comprise a collection of vibrations characterized by amplitudes and frequencies of the vibrations with respect to time. In some embodiments, pattern may not be limited to "regular" patterns (e.g., sinusoidal or the like). That is, such patterns may include irregularities in amplitudes and frequencies and may not be uniform.

Identifier device 109 may also be configured to communicate with kiosk 101 using a computer network, e.g., network 107b. Although depicted separately, network 107b may comprise, at least in part, network 107a. Network 107b may comprise the Internet, a LAN, or the like and may use one or more wireless standards, such as Wi-Fi, 4G, LTE, or the like, and/or one or more wired standards, such as Ethernet, token ring, or the like. Alternatively, network 107b may comprise a short-range communication link established using one or more standards, such as NFC, Bluetooth®, or the like.

In any of the embodiments described above, sensor 105b may be optional; in such cases, identifier device 109 may communicate the identifier to kiosk 101 via network 107b. For example, if identifier device 109 comprises a contactless card, a smartphone, a tablet, a contactless keychain, or the like, kiosk 101 may receive the identifier using a short-range communication link established using one or more standards, such as NFC, Bluetooth®, or the like and/or using a computer network, such as the Internet, a LAN, or the like, operating using one or more wireless standards, such as Wi-Fi, 4G, LTE, or the like.

Accordingly, system 100 may allow for two-factor authentication of a user having external device 103 and identifier device 109 (or, in embodiments where external device 103 and identifier device 109 comprise a same, single device, the single device). For example, kiosk 101 may receive an identifier of the user from identifier device 109 and determine a predicted pattern of vibration expected from external device 103. For example, the predicted pattern of vibration may comprise a stored pattern of vibration associated with the identifier. Alternatively, kiosk 101 may transmit a command to external device 103 that is associated with the identifier, and thus the predicted pattern of vibration may comprise the pattern transmitted to external device 103.

In some embodiments, as explained below with respect to FIG. 3, kiosk 101 may transform the predicted pattern into predicted measurements from external device 103 and/or transform measurements from external device 103 into a pattern for comparison against the predicted pattern.

Moreover, as explained below with respect to FIG. 2, kiosk 101 may authenticate user based on a degree of difference between the predicted measurements and measurements from sensor 105a and/or between the predicted pattern and the pattern for comparison based on measurements from sensor 105a.

Although not depicted in FIG. 1, system 100 may further include at least one scale. For example, the at least one scale may measure the weight of external device 103. The at least one scale may be used in authenticating the user. For example, the identifier may be associated with a weight, and the authentication may be further based on a degree of difference between a measured weight of external device 103 and the weight associated with the identifier. Additionally or alternatively, the at least one scale may be used to select a transformation for the predicted pattern to predicted measurements and/or for the measurements to a pattern for comparison. For example, the measured weight may be used to select one or more possible models for external device 103, each model being associated with one or more transformations.

Moreover, the scale may be used to calibrate kiosk 101. For example, kiosk 101 may measure the weight of external device 103 and may also transmit a pattern of vibrations to external device 103. Accordingly, kiosk 101 may receive measurements from sensor 105a corresponding to the pattern of vibrations. Kiosk 101 may thus store the measurements, the pattern of vibrations, a transformation from the measurements to the pattern, a transformation from the pattern to the measurements, or a combination thereof in associated with the measured weight. Furthermore, kiosk 101 may receive an indicator of a model of external device 103 and index the data structure storing the measured weight with the associated measurements, pattern of vibrations, transformation from the measurements to the pattern, transformation from the pattern to the measurements, or combination thereof with the model indicator. In some embodiments, this calibration may be performed remotely from kiosk 101 such that the indexed data structure is transferred to kiosk 101 for storage and/or is retrievable by kiosk 101 (e.g., from a server remote from kiosk 101).

In some embodiments, kiosk 101 may perform a calibration without at least one scale. For example, kiosk 101 may transmit a pattern of vibrations to external device 103. Kiosk 101 may receive measurements from sensor 105a corresponding to the pattern of vibrations. Kiosk 101 may thus store the measurements, the pattern of vibrations, a transformation from the measurements to the pattern, a transformation from the pattern to the measurements, or a combination thereof in associated with a received indicator of a model of external device 103. Thus, in some embodiments, kiosk 101 may index the data structure storing the associated measurements, pattern of vibrations, transformation from the measurements to the pattern, transformation from the pattern to the measurements, or combination thereof with the received model indicator. In some embodiments, this calibration may be performed remotely from kiosk 101 such that the indexed data structure is transferred to kiosk 101 for storage and/or is retrievable by kiosk 101 (e.g., from a server remote from kiosk 101).

During calibration, kiosk 101 may display a message to a user to remove a case or other cover from external device 103. For example, the case or other cover may alter the measurements (e.g., from the at least one scale and/or caused by the vibrations) such that they no longer correlate to the indicator of the model of external device 103. Alternatively, kiosk 101 may calibrate external device 103 with the case or other cover present on external device 103. Accordingly, a pattern and/or transformation stored in associated with the identifier of the user and/or the indicator of the model may account for the case and/or other cover. In some embodiments, the indicator of the model may further include a sub-indicator of the model for the case and/or other cover, if any.

Figure 2:
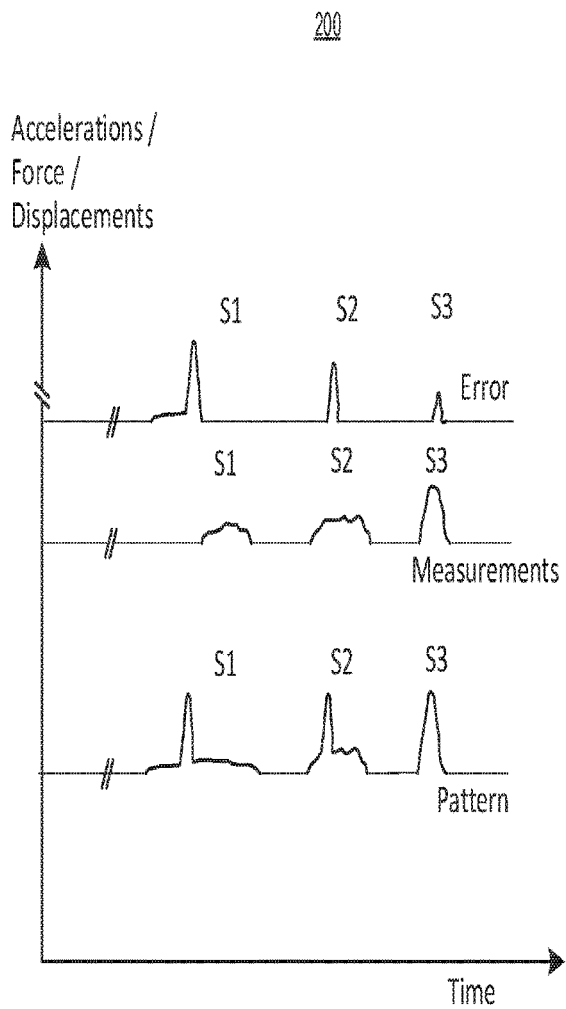
FIG. 2 is a graphical representation of an example comparison of haptic measurements with a haptic pattern, consistent with embodiments of the present disclosure.

FIG. 2 depicts an example graphical representation 200 of a degree of difference between a set of measurements and a pattern of vibrations. In the example of FIG. 2, the "Error" represents a function (mathematically, a correspondence between the domain, time in the example of FIG. 2, and the range, amplitudes or other measures of vibrational strength in the example of FIG. 2, such that each member of the set comprising the domain corresponds to a single member of the set comprising the range) that is the difference between the "Pattern" function and the "Measurements" function. In some embodiments, the difference may be signed while, in other embodiments, the difference may be unsigned.

In the example of FIG. 2, the haptic vibrations may be encoded as strengths with respect to time such that the values of the functions are all positive. For example, peaks S1, S2, and S3 all represent spikes in strengths of vibrations, which represent underlying sinusoidal or other periodic vibrations caused by a haptic motor, e.g., of external device 103 of FIG. 1. In alternative embodiments, the haptic vibrations may be encoded as the periodic vibrations such that the values of the functions oscillate between positive and negative.

Although depicted as a difference, one or more other measures may be used as the degree of difference or as a basis for determining the degree of difference. For example, an autocorrelation between the "Pattern" function and the "Measurements" function, convolution between the "Pattern" function and the "Measurements" function, or the like may be used to determine the degree of difference, which may be a maximum of the autocorrelation function, a minimum of the autocorrelation function, an unsigned area of the autocorrelation function, or the like. Moreover, although depicted as continuous in FIG. 2, one or more of the "Error" function, the "Pattern" function, and the "Measurements" function may be discontinuous (e.g., comprising, graphically, a scatter plot rather than a solid line). For example, the "Pattern" function may comprise discrete vibrational strengths representing commands to a haptic motor and/or the "Measurements" function may comprise discrete measurements from sensor 105a of FIG. 1.

The "Error" function may be used as the degree of difference to authenticate the user. For example, the degree of difference may be assessed as a maximum of the "Error" function, a minimum of the "Error" function, an integral of the "Error" function, or other measurements of the magnitude of the "Error" function at one or more times (or a combination of times). Accordingly, when the degree of difference is below a threshold, the system (e.g., kiosk 101 of FIG. 1) may authenticate the user while, when the degree of difference is above a threshold, the system (e.g., kiosk 101 of FIG. 1) may deny access to the user. In some embodiments, the system (e.g., kiosk 101 of FIG. 1) may employ a multi-tiered authentication scheme. For example, when the degree of difference is below a first threshold, the system (e.g., kiosk 101 of FIG. 1) may authenticate the user, when the degree of difference is above the first threshold but below a second, higher threshold, the system (e.g., kiosk 101 of FIG. 1) may prompt the user for an additional credential (e.g., a PIN, a password, or the like), and when the degree of difference is above the second threshold, the system (e.g., kiosk 101 of FIG. 1) may deny access to the user.

Figure 3:
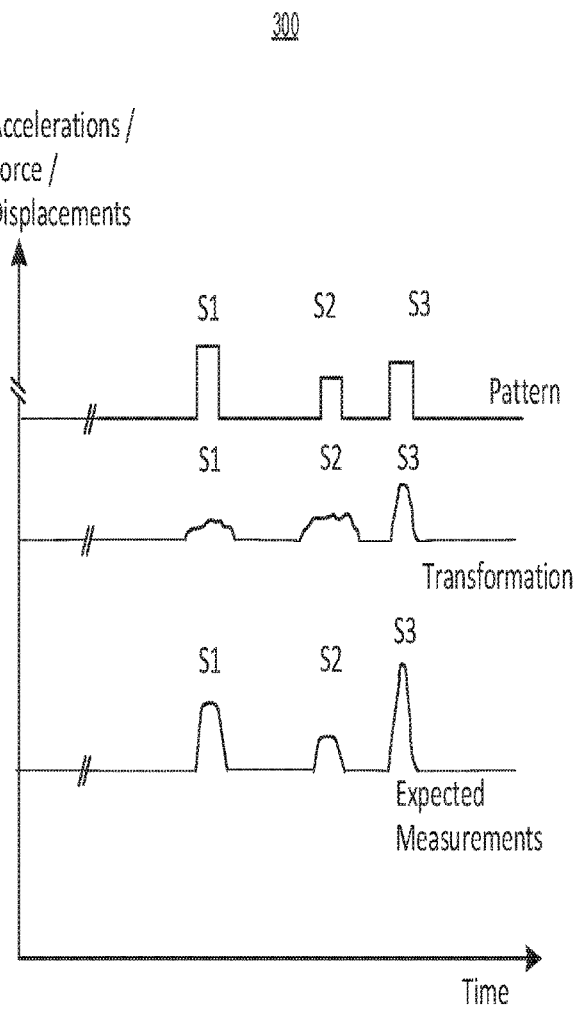
FIG. 3 is a graphical representation of a transformation used to transform a haptic pattern to expected haptic measurements, consistent with embodiments of the present disclosure.

FIG. 3 depicts an example graphical representation 300 of a transformation from a pattern of vibrations to an expected set of measurements. In the example of FIG. 2, the "Transformation" represents a function (mathematically, a correspondence between the domain, time in the example of FIG. 3, and the range, amplitudes or other measures of vibrational strength in the example of FIG. 3, such that each member of the set comprising the domain corresponds to a single member of the set comprising the range) that transforms the "Pattern" function into the "Expected Measurements" function. Alternatively, the "Transformation" function may represent a function that transforms a "Measurements" function into an "Expected Pattern" function. Accordingly, the "Expected Measurements" function and a "Measurements" function or the "Pattern" function and an "Expected Pattern" function may be compared as explained above with respect to FIG. 2. For example, the system (e.g., kiosk 101 of FIG. 1) may authenticate a user based on a degree of difference between the "Expected Measurements" function and the "Measurements" function. Similarly, the system (e.g., kiosk 101 of FIG. 1) may authenticate a user based on a degree of difference between the "Expected Pattern" function and the "Pattern" function.

In the example of FIG. 3, similar to the example of FIG. 2, the haptic vibrations may be encoded as strengths with respect to time such that the values of the functions are all positive. For example, peaks S1, S2, and S3 all represent spikes in strengths of vibrations, which represent underlying sinusoidal or other periodic vibrations caused by a haptic motor, e.g., of external device 103 of FIG. 1. In alternative embodiments, the haptic vibrations may be encoded as the periodic vibrations such that the values of the functions oscillate between positive and negative.

Although the "Transformation" function is depicted as multiplicative, one or more other transformations may be used, such as an additive transformation, a Fourier transformation, a translational transformation, or the like. Moreover, although depicted as continuous in FIG. 2, one or more of the "Transformation" function, the "Pattern" function, and the "Expected Measurements" function may be discontinuous (e.g., comprising, graphically, a scatter plot rather than a solid line). For example, the "Pattern" function may comprise discrete vibrational strengths representing commands to a haptic motor and/or the "Expected Measurements" function may comprise discrete measurements expected from sensor 105a of FIG. 1.

The "Transformation" function may represent a function selected by the system (e.g., kiosk 101 of FIG. 1 or server 800 of FIG. 8) based on a measured weight and/or a received model of external device 103 of FIG. 1. For example, the system (e.g., kiosk 101 of FIG. 1 or server 800 of FIG. 8) may receive an indicator of the model of external device 103 of FIG. 1 and retrieve one or more "Transformation" functions indexed to the received indicator. Additionally or alternatively, the system (e.g., kiosk 101 of FIG. 1 or server 800 of FIG. 8) may measure a weight (e.g., using at least one scale) of the model of external device 103 of FIG. 1 and retrieve one or more "Transformation" functions indexed to the measured weight (optionally plus or minus a predetermined margin of error, such as one gram, two grams, 1%, 2%, 5%, or the like). Accordingly, the system (e.g., kiosk 101 of FIG. 1 or server 800 of FIG. 8) may then use the one or more "Transformation" functions to authenticate a user, as explained above.

In embodiments where the system (e.g., kiosk 101 of FIG. 1 or server 800 of FIG. 8) retrieves more than one "Transformation" function, the system may apply the plurality of "Transformation" functions to generate a plurality of "Expected Measurements" or "Expected Pattern" functions and select the corresponding "Expected Measurements" or "Expected Pattern" function that minimizes a degree of difference between the "Expected Measurements" function and a "Measurements" function or the "Expected Pattern" function and a "Pattern" function.

Figure 4:
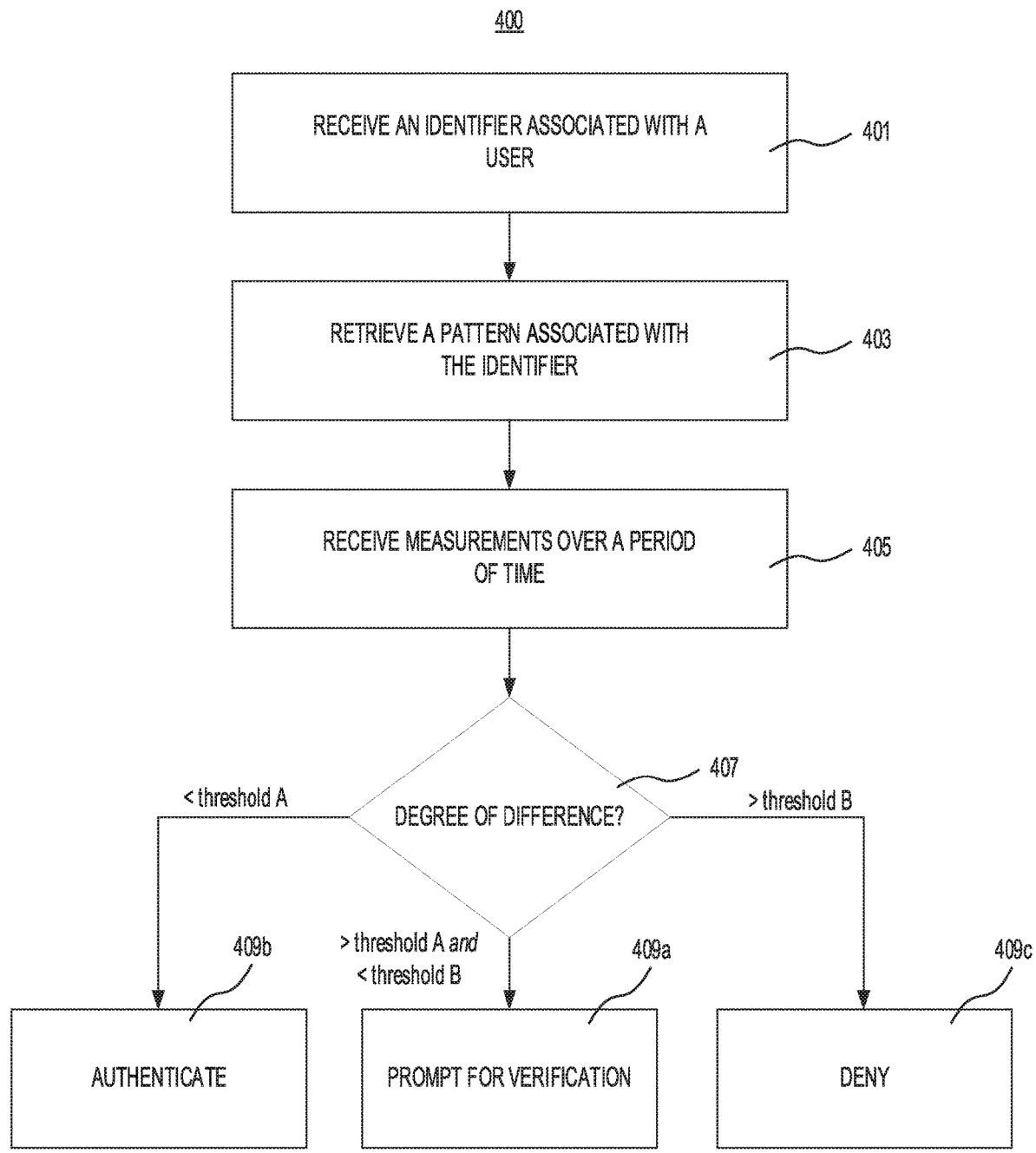
FIG. 4 is a flowchart of an exemplary method for inter-device communication using haptic vibration, consistent with embodiments of the present disclosure.

FIG. 4 is a flowchart of exemplary method 400 for inter-device communication using haptic vibration. Exemplary method 400 may be implemented by, for example, one or more processors of kiosk 101 of FIG. 1 and/or server 800 of FIG. 8. Exemplary method 400 may further be implemented using a general purpose computer or special purpose computer having at least one processor.

At step 401, the processor may receive an identifier associated with a user. For example, as explained above with respect to FIG. 1, kiosk 101 may receive an identifier from device 103 using sensor 105b.

In some embodiments, a contactless reader may receive the identifier from a contactless device associated with the user. In such embodiments, the contactless device may comprise the same device that vibrates (as explained below in step 405). Alternatively, as explained above with respect to FIG. 1, the contactless device (e.g., device 103) may comprise a contactless card (e.g., using NFC or radio frequency identification (RFID) technology), a portable contactless device (e.g., a contactless keychain such as keychain 600, a contactless fob, etc.), or the like.

Additionally or alternatively, a card reader may receive the identifier from a card associated with the user. For example, as explained above, the card may comprise a debit card, credit card, identification card, or any other card including the identifier that is extractable by sensor 105b of FIG. 1.

Additionally or alternatively, one or more input keys may receive the identifier from the user. For example, the identifier may comprise a personal identification number (PIN) entered by the user using a keypad, keyboard, or the like.

At step 403, the processor may retrieve a pattern associated with the received identifier. In some embodiments, the pattern may comprise one or more strengths with respect to time, as depicted above in FIG. 2. In some embodiments, the pattern comprises a plurality of expected measurements over the period of time, as depicted above in FIG. 3.

At step 405, the processor may receive, from at least one of a force gauge or an accelerometer, one or more measurements over a period of time. For example, measurements may be received from sensor 105a of FIG. 1, as explained above. In some embodiments, the one or more measurements may comprise measurements of strengths of vibrations, e.g., of external device 103 of FIG. 1.

At step 407, the processor may assess a degree of difference between the received one or more measurements and the retrieved pattern. For example, the degree of difference may be determined as explained above with respect to FIG. 2. In embodiments where the pattern comprises one or more strengths, the degree of difference may be between the received one or more measurements of strengths and the one or more strengths of the retrieved pattern.

In some embodiments, the degree of difference may depend on a combination of difference magnitudes between a measured strength and a strength of the retrieved pattern at each of a plurality of intervals over the period of time. For example, as explained above with respect to FIG. 2, the degree of difference may be determined based on a subtraction (whether signed or unsigned) of the measurements (or from an expected pattern as explained with respect to FIG. 3) from the retrieved pattern (or from expected measurements as explained with respect to FIG. 3). Alternatively, the degree of difference may depend on an autocorrelation of a function representing the one or more measured strengths over time and a function representing the one or more strengths of the retrieved pattern over time. For example, the degree of difference may comprise a maximum or a minimum of the autocorrelation function, an unsigned area (e.g., an integral) of the autocorrelation function, or the like.

When the degree of difference is below a threshold, the processor may determine whether to authenticate the user. For example, method 400 may then trifurcate. For example, at step 409a, the processor may prompt the user for an additional verification, such as a PIN, a password, or the like. At step 409b, the processor may authenticate the user. At step 409c, the processor may deny access to the user. Two thresholds may delineate steps 409a, 409b, and 409c. For example, as described above, the processor may authenticate the user when the degree of difference is below both thresholds, prompt the user for the additional verification when the degree of difference is between the thresholds, and deny access when the degree of difference is above both thresholds.

Although depicted as trifurcating, other variations of method 400 are possible. For example, method 400 may bifurcate such that the processor authenticates the user when the degree of difference below a threshold and prompts the user for additional verification when the degree of difference is above the threshold. In another example, method 400 may bifurcate such that the processor prompts the user for the additional verification when the degree of difference is below a threshold and denies access when the degree of difference is above the threshold.

In any of the embodiments described above, a plurality of additional verifications may be used. For example, the processor may authenticate the user when the degree of difference is below both thresholds, prompt the user for a first additional verification when the degree of difference is between the thresholds, and prompt the user for a second additional verification when the degree of difference is above both thresholds. In another example, the processor may prompt the user for a first additional verification when the degree of difference is below both thresholds, prompt the user for a second additional verification when the degree of difference is between the thresholds, and deny access when the degree of difference is above both thresholds. Although described above using two additional verifications, any number of additional verifications in combination with any number of thresholds may be used. The additional verifications may increase in complexity in tandem with increases in the degree of difference. For example, the first additional verification may comprise a PIN, and the second additional verification may comprise a password. In another example, the first additional verification may comprise a PIN, and the second additional verification may comprise a biometric (e.g., a fingerprint or the like).

In any of the embodiments described above, one or more of the thresholds may be dynamic. For example, one or more of the thresholds may be adjusted based on a degree of difference between a measured weight of external device 103 and an expected weight of external device 103, as explained further below. In another example, one or more thresholds may be adjusted based on a degree of vulnerability associated with the received identifier. For example, a user whose account has been hacked previously may be associated with lower (that is, stricter) thresholds than another user whose account has not been hacked previously.

Method 400 may include additional steps. For example, method 400 may include determining, based on the identifier, an expected model of the external device and converting the retrieved pattern to the plurality of expected measurements based on the expected model. As explained above with respect to FIG. 1, a database may map user identifiers to expected models, which are further mapped to one or more transformations (as explained above with respect to FIG. 3). Alternatively to converting the retrieved pattern, the one or more transformations may convert the one or more measurements to an expected pattern. In some embodiments, the processor may have previously received the expected model from the user and stored the expected model in the at least one memory for retrieval. For example, the user may provide the model during a registration procedure and/or during a calibration process, e.g., method 500 of FIG. 5 explained below.

Additionally or alternatively, method 400 may include receiving, from the at least one scale, a measured weight and determining, based on the measured weight, one or more expected models of the external device. For example, as explained above with respect to FIG. 1, a database may map, weights to one or more models. Based on a margin of error (e.g., 1 gram, 2 grams, 1%, 2%, 5%, or the like), the processor may determine the one or more expected models. In such embodiments, method 400 may further include retrieving an expected model associated with the received identifier, as explained above. Accordingly, when the expected model comprises one of the one or more expected models, the processor may proceed to retrieve a pattern of vibrations associated with the received identifier (as explained above); receive, from the least one of a force gauge or an accelerometer, one or more measurements of vibrations (as explained in step 405 above); assess a degree of difference between the received one or more measurements and the retrieved pattern (as explained in step 407 above); and when the degree of difference is below a threshold, determine whether to authenticate the user (as explained in steps 409a, 409b, and 409c above). Accordingly, the use of a non-registered and/or non-calibrated device may be prevented by refusing to accept measurements caused by vibrations of a device having a weight not within a margin of error of the weight of the expected model associated with the user identifier.

In any of the embodiments described above, the expected model may comprise at least one of a weight associated with the external device and a vibrational frequency associated with the external device. For example, the vibrational frequency may map a series of forces, accelerations, or the like measured by the at least one of a force gauge or an accelerometer to positive measurements of the amplitudes of those vibrations, as discussed with respect to FIGS. 2 and 3.

In any of the embodiments described above, method 400 may further include activating the at least one accelerometer (e.g., providing power to, e.g., by closing one or more switches) after receiving the identifier and/or disabling the at least one accelerometer (e.g., by eliminating power to it, e.g., by opening one or more switches) after determining to authenticate (or deny access to) the user.

Figure 5:
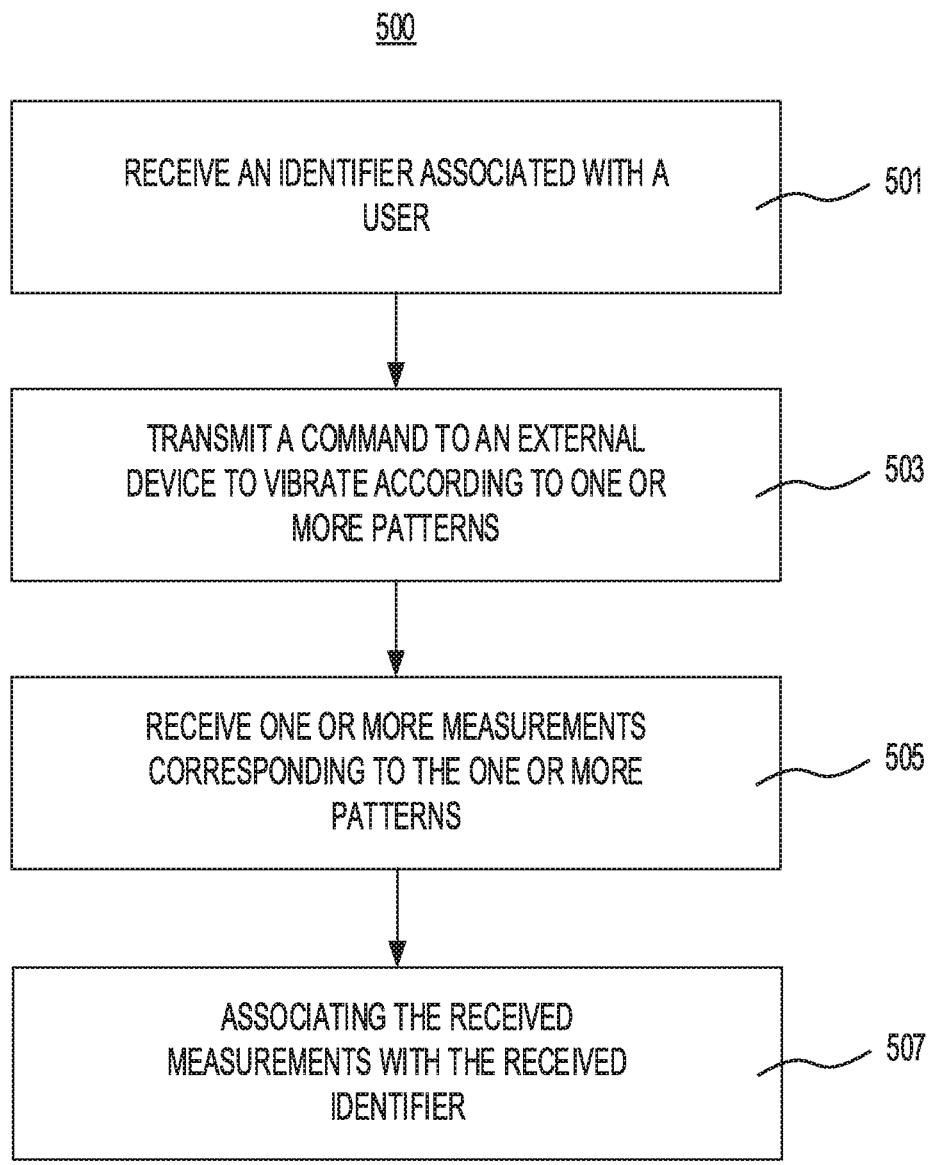
FIG. 5 is a flowchart of an exemplary method for calibration of inter-device communication using haptic vibration, consistent with embodiments of the present disclosure.

FIG. 5 is a flowchart of exemplary method 500 for calibration of inter-device communication using haptic vibration. Exemplary method 500 may be implemented by, for example, one or more processors of kiosk 101 of FIG. 1 and/or server 800 of FIG. 8. Exemplary method 500 may further be implemented using a general purpose computer or special purpose computer having at least one processor.

At step 501, the processor may receive, from a user, an identifier of the user. For example, step 501 may be performed similarly to step 401 of method 400, as described above with respect to FIG. 4.

In some embodiments, the processor may further receive, from at least one scale, a measured weight of the external device. In such embodiments, the processor may determine, using a stored table, one or more likely models for the external device. For example, as explained above with respect to FIG. 1, the stored table may associate weights with expected models. As further explained above, the one or more likely models may be selected based on a margin of error (e.g., 1 gram, 2 grams, 1%, 2% 5%, or the like).

At step 503, the processor may transmit a command to the external device configured to cause the external device to vibrate according to one or more patterns. For example, as explained above with respect to FIG. 1, the processor may transmit the command over a computer network (e.g., networks 107a/107b) and/or using a short-range communication link such as NFC, Bluetooth®, or the like. The command may be randomly generated by the processor or previously stored in a table accessible by the processor.

At step 505, the processor may receive, from the at least one of a force gauge or an accelerometer, one or more measurements corresponding to the one or more patterns, e.g., as depicted above in FIG. 2.

At step 507, the processor may select a correct model from the one or more likely models by verifying that the mapped one or more transformations transform the one or more measurements into the one or more patterns, within a margin of error. For example, as explained above with respect to FIGS. 2 and 3, one or more transformations that reduce a degree of difference may be selected. Accordingly, the processor may associate the received identifier with the selected correct model.

Alternatively, the processor may generate a data structure mapping the one or more measurements to the one or more patterns and index the data structure by the received identifier. For example, the data structure may function similar to a transformation by mapping particular portions of one or more patterns to one or more particular measurements.

Additionally or alternatively, the processor may receive, from the user, an indication of a model of the external device. In such embodiments, the generated data structure may additionally or alternatively be indexed by the received model indication.

Method 500 may include additional steps. For example, method 500 may include receiving, from the at least one scale, a measured weight of the external device. In such embodiments, the processor may associate the received identifier with the received model indication and the measured weight.

Figure 6:
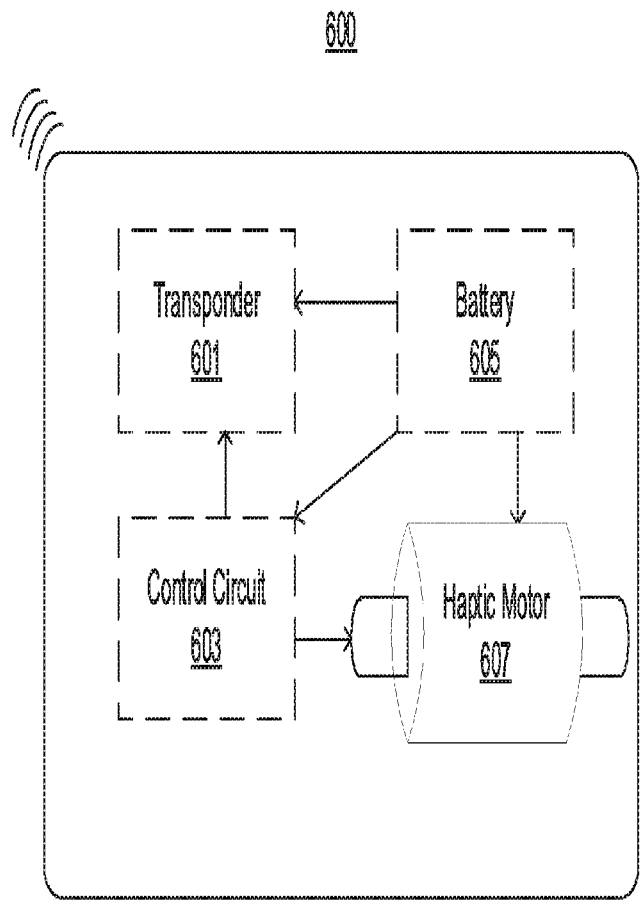
FIG. 6 is a depiction of an exemplary haptic keychain, consistent with embodiments of the present disclosure.

FIG. 6 is a depiction of example keychain 600 that may, for example, be used as external device 103 of FIG. 1. As depicted in FIG. 6, keychain 600 may include a transponder 601, a control circuit 603, a battery 605, and a haptic motor 607. Accordingly, as depicted in FIG. 6, battery 605 may power transponder 601, control circuit 603, and haptic motor 607.

In some embodiment, transponder 601 may comprise a transceiver, e.g., operating in a radio frequency range or other frequency of light used to send and receive signals. In other embodiments, transponder 601 may comprise a receiver that only receives signals and does not transmit signals. In such embodiments, keychain 600 may further comprise a button or other manual input mechanism, e.g., to activate haptic motor 607.

Battery 605 may comprise a nickel-iron battery, a lithium ion battery, or other battery that may be re-chargeable or non-rechargeable. Battery 605 may be replaceable, e.g., by opening keychain 600 along a junction between one or more pieces (e.g., of plastic, of metal, or the like) forming a housing for transponder 601, control circuit 603, battery 605, and haptic motor 607. Alternatively, battery 605 may be integral to keychain 600.

Haptic motor 607 may comprise an eccentric rotating mass (ERM) haptic motor, a linear resonant actuator (LRA) haptic motor, or any other device configured to transform electric power from battery 605 into rotational energy and/or vibrational energy. Control circuit 603 may comprise a microprocessor or any other circuit controlling the content transmitted by transponder 601 and/or the pattern of vibrations caused by haptic motor 607. For example, control circuit 603 may control timing, intensity, or other properties of a radio frequency signal transmitted by transponder 601 and/or timing, intensity, or other properties of the vibrations caused by haptic motor 607. Accordingly, control circuit 603 may comprise a clock circuit or other circuit controlling such properties. Control circuit 603 may control one or more properties of the vibrations signal based on a control signal received by transponder 601. For example, kiosk 101 of FIG. 1 may execute, at least in part, method 500 of FIG. 5 and transmit a corresponding control signal to adjust the vibrations of haptic motor 607. Alternatively, control circuit 603 may activate stored controls based on a prompting signal received by transponder 601. For example, the stored controls may comprise a stored pattern previously received by transponder 601 and associated with an identifier of a user, e.g., as stored in associated on kiosk 101 of FIG. 1 or server 800 of FIG. 8.

In some embodiments, keychain 600 may be implemented as a portable contactless device (e.g., a contactless fob).

Figure 7A:
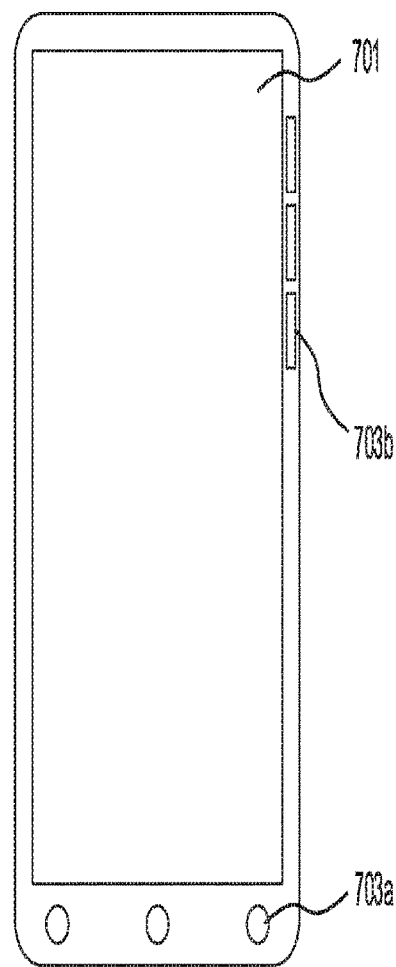
FIG. 7A is a depiction of an exemplary haptic smartphone, consistent with embodiments of the present disclosure.

FIG. 7A is a depiction of an example smartphone 700 that may, for example, be used as external device 103 of FIG. 1. As depicted in FIG. 7A, device 700 may comprise a smartphone or tablet. Device 700 may have a screen 701. For example, screen 701 may display one or more graphical user interfaces (GUIs) that allow a user of device 700 to send information to and receive information from one or more computer networks. In certain aspects, screen 701 may comprise a touchscreen to facilitate use of the one or more GUIs.

As further depicted in FIG. 7A, device 700 may have one or more buttons, e.g., buttons 703a and 703b. For example, buttons 703a and 703b may facilitate use of one or more GUIs displayed on screen 701.

Figure 7B:
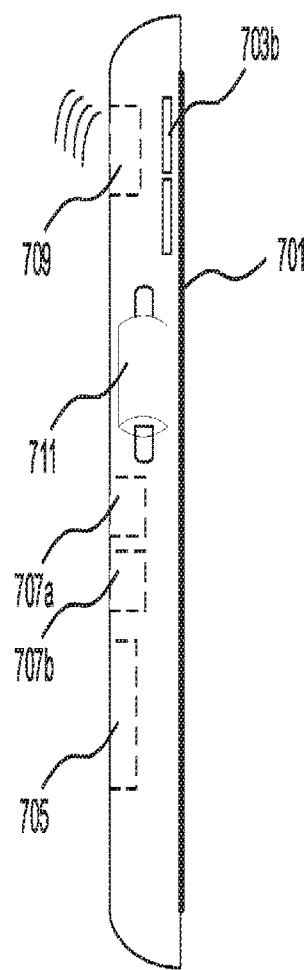
FIG. 7B is a side view of the device of FIG. 7A.

FIG. 7B is a side view of user interface device 700 of FIG. 7A. As depicted in FIG. 7B, device 700 may have at least one processor 705. For example, at least one processor 705 may comprise a system-on-a-chip (SOC) adapted for use in a portable device, such as device 700. Alternatively or concurrently, at least one processor 705 may comprise any other type(s) of processor.

As further depicted in FIG. 7B, device 700 may include a network interface 709. For example, network interface 709 may comprise a wireless interface, e.g., a network interface card (NIC) configured to utilize Wi-Fi, Bluetooth, 4G, etc. In other embodiments, network interface 709 may comprise a wired interface, e.g., an NIC configured to utilize Ethernet, Token Ring, etc. In some embodiments, network interface 709 may permit device 700 to send information to and receive information from one or more computer networks.

As further depicted in FIG. 7B, device 700 may have one or more memories, e.g., memories 707a and 707b. In certain aspects, some of the one or more memories, e.g., memory 707a, may comprise a volatile memory. In such aspects, memory 707a, for example, may store one or more applications (or "apps") for execution on at least one processor 705. For example, an app may include an operating system for device 700 and/or an app for executing one or more steps of methods disclosed herein. In addition, an app may be used to send data to and receive data from one or more computer networks, e.g., data sent and received to kiosk 101 of FIG. 1 and/or server 800 of FIG. 8 in accordance with one or more steps of methods disclosed herein. In addition, memory 707*a* may store data generated by, associated with, or otherwise unrelated to an app in memory 707*a*.

Alternatively or concurrently, some of the one or more memories, e.g., memory 707*b*, may comprise a non-volatile memory. In such aspects, memory 707*b*, for example, may store one or more applications (or "apps") for execution on at least one processor 705. For example, as discussed above, an app may include an operating system for device 700, an app for executing one or more steps of methods disclosed herein, and/or an app for sending data to and receiving data from one or more computer networks, e.g., data sent and received in accordance with one or more steps of methods disclosed herein. In addition, memory 707*b* may store data generated by, associated with, or otherwise unrelated to an app in memory 707*b*. Furthermore, memory 707*b* may include a pagefile, swap partition, or other allocation of storage to allow for the use of memory 707*b* as a substitute for a volatile memory if, for example, memory 707*a* is full or nearing capacity.

Figure 8:
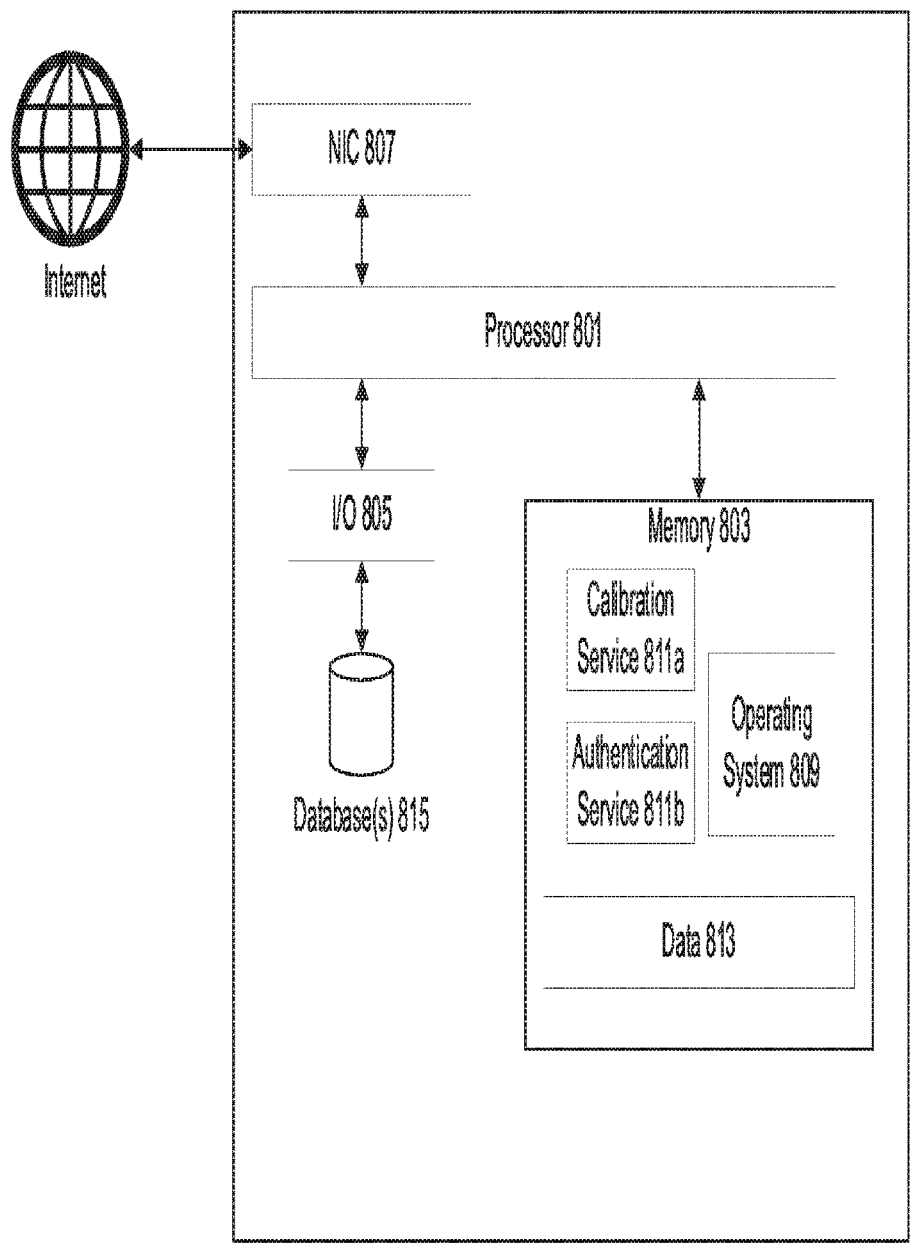
FIG. 8 is a depiction of an exemplary server for executing methods consistent with the present disclosure.

FIG. 8 is a depiction of an example server 800 for inter-device communication using haptic vibration and/or calibration of inter-device communication using haptic vibration. Server 800 of FIG. 8 may comprise or be in communication with kiosk 101 of FIG. 1. As depicted in FIG. 8, server 800 may have a processor 801. Processor 801 may comprise a single processor or a plurality of processors. For example, processor 801 may comprise a CPU, a GPU, a reconfigurable array (e.g., an FPGA or other ASIC), or the like.

Processor 801 may be in operable connection with a memory 803, an input/output module 805, and a network interface controller (NIC) 807. Memory 803 may comprise a single memory or a plurality of memories. In addition, memory 803 may comprise volatile memory, non-volatile memory, or a combination thereof. As depicted in FIG. 8, memory 803 may store one or more operating systems 809 and a credentialing service 811. For example, calibration service 811*a* may include instructions to execute all or part of method 500 of FIG. 5. Similarly, authentication service 811*b* may include instructions to execute all or part of method 400 of FIG. 4. Accordingly, processor 801 may execute all or part of method 400 of FIG. 4 and/or method 500 of FIG. 5. In addition, memory 803 may store data 813 produced by, associated with, or otherwise unrelated to operating system 809 and/or credentialing service 811.

Input/output module 805 may store and retrieve data from one or more databases 815. For example, database(s) 815 may include data structures indexed by weight and/or model, as described above. Additionally or alternatively, database(s) 815 may include identifiers of users, whether encrypted or unencrypted.

NIC 807 may connect server 800 to one or more computer networks. In the example of FIG. 8, NIC 807 connects server 800 to the Internet. Server 800 may receive data and instructions over a network using NIC 807 and may transmit data and instructions over a network using NIC 807.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

Instructions or operational steps stored by a computer-readable medium may be in the form of computer programs, program modules, or codes. As described herein, computer programs, program modules, and code based on the written description of this specification, such as those used by the controller, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for calibration of a device for inter-device communication, comprising:
   one or more processors; and
   a non-transitory, computer-readable medium storing instructions that, when executed by the one or more processors, cause operations comprising:
   receiving an identifier associated with a user;
   transmitting a command to an external device associated with the user, the command instructing the external device to vibrate according to one or more command patterns associated with the command;
   receiving one or more measurements derived from the external device vibrating according to the one or more command patterns;
   selecting a first model of a plurality of models based on the first model having a first transformation that transforms the one or more command patterns into one or more expected measurements matching the one or more measurements; and associating the identifier with the first model.

2. The system of claim 1, wherein the operations further comprise assessing a degree of difference between the one or more measurements and the one or more expected measurements.

3. The system of claim 2, wherein the degree of difference depends on a difference in magnitudes between a measured force and a force of the first model over a period of time.

4. The system of claim 3, wherein the degree of difference depends on a magnitude of the one or more measurements over a plurality of time intervals.

5. The system of claim 3, wherein the degree of difference is determined based on a subtraction of measurements.

6. The system of claim 3, wherein the degree of difference is determined based on an autocorrelation of the one or more measurements and the one or more expected measurements.

7. The system of claim 3, wherein the operations further comprise prompting the user to recapture measurements when the degree of difference is below a threshold.

8. A method comprising:
receiving an identifier associated with a user,
receiving one or more measurements,
selecting a first model of a plurality of models based on the first model having a first transformation that transforms the one or more measurements into one or more command patterns, and
associating the identifier with the first model.

9. The method of claim 8, further comprising assessing a degree of difference between the one or more measurements and the first model.

10. The method of claim 9, wherein the degree of difference depends on a difference in magnitudes between a measured force and a force of the first model over a period of time.

11. The method of claim 10, wherein the degree of difference depends on a magnitude of the one or more measurements over a plurality of time intervals.

12. The method of claim 10, wherein the degree of difference is determined based on a subtraction of measurements.

13. The method of claim 10, wherein the degree of difference is determined based on an autocorrelation of the one or more measurements and the first model.

14. The method of claim 10, further comprising prompting the user to recapture measurements when the degree of difference is below a threshold.

15. One or more non-transitory computer-readable media storing instructions that, when executed by one or more processors, cause operations comprising:
receiving an identifier associated with a user;
receiving one or more measurements;
selecting a first model of a plurality of models based on the first model having a first transformation that transforms the one or more measurements into one or more command patterns; and
associating the identifier with the first model.

16. The one or more non-transitory computer-readable media of claim 15, further comprising assessing a degree of difference between the one or more measurements and the first model.

17. The one or more non-transitory computer-readable media of claim 16, wherein the degree of difference depends on a difference in magnitudes between a measured force and a force of the first model over a period of time.

18. The one or more non-transitory computer-readable media of claim 17, wherein the degree of difference depends on a magnitude of the one or more measurements over a plurality of time intervals.

19. The one or more non-transitory computer-readable media of claim 17, wherein the degree of difference is determined based on a subtraction of measurements.

20. The one or more non-transitory computer-readable media of claim 17, wherein the degree of difference is determined based on an autocorrelation of the one or more measurements and the first model.

* * * * *